(12) United States Patent
Hanna (10) Patent No.: US 8,458,462 B1
(45) Date of Patent: Jun. 4, 2013

(54) VERIFYING INTEGRITY OF NETWORK DEVICES FOR SECURE MULTICAST COMMUNICATIONS

(75) Inventor: Stephen R. Hanna, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1193 days.

(21) Appl. No.: 12/271,555

(22) Filed: Nov. 14, 2008

Related U.S. Application Data (60) Provisional application No. 61/088,931, filed on Aug. 14, 2008.

(51) Int. Cl.
*H04L 29/06* (2006.01)
*H04L 9/32* (2006.01)

(52) U.S. Cl.
USPC .............. 713/163; 713/156; 713/175; 726/10

(58) Field of Classification Search
None
See application file for complete search history.

(56) References Cited

U.S. PATENT DOCUMENTS

| | | | | |
|---|---|---|---|---|
| 6,275,859 | B1 * | 8/2001 | Wesley et al. | 709/229 |
| 6,718,387 | B1 * | 4/2004 | Gupta et al. | 709/226 |
| 6,816,966 | B1 * | 11/2004 | Gupta et al. | 713/163 |
| 7,334,125 | B1 * | 2/2008 | Pellacuru | 713/163 |
| 7,526,649 | B2 * | 4/2009 | Wiseman et al. | 713/175 |
| 7,577,258 | B2 * | 8/2009 | Wiseman et al. | 380/281 |
| 7,627,755 | B2 * | 12/2009 | Ahonen et al. | 713/163 |
| 7,770,000 | B2 * | 8/2010 | Schunter et al. | 713/155 |
| 8,218,772 | B2 * | 7/2012 | Aciicmez et al. | 380/277 |
| 2004/0039906 | A1 * | 2/2004 | Oka et al. | 713/156 |
| 2004/0153414 | A1 * | 8/2004 | Khaishgi et al. | 705/58 |
| 2005/0187878 | A1 * | 8/2005 | Khaishgi et al. | 705/58 |
| 2006/0106836 | A1 * | 5/2006 | Masugi et al. | 707/101 |
| 2006/0114889 | A1 * | 6/2006 | Schneider et al. | 370/352 |
| 2006/0200856 | A1 * | 9/2006 | Salowey et al. | 726/5 |
| 2007/0003064 | A1 * | 1/2007 | Wiseman et al. | 380/281 |
| 2007/0234057 | A1 * | 10/2007 | Miyazawa | 713/175 |
| 2008/0016335 | A1 * | 1/2008 | Takahashi et al. | 713/156 |
| 2008/0086635 | A1 * | 4/2008 | Agrawal et al. | 713/156 |

* cited by examiner

*Primary Examiner* — Christopher Revak
(74) *Attorney, Agent, or Firm* — Shumaker & Sieffert, P.A.

(57) ABSTRACT

A network device, such as an access control server, verifies the integrity of other network devices requiring access to a secure multicast. The network device receives a health status report from the other network devices and grants or denies access to the secure multicast based on a comparison of the health status report with a set of one or more stored policies. The network device then provides group keys to authorized network devices. The network device may also include a monitoring module that monitors activities of authorized network devices. Where the network device monitors authorized network devices, authorized network devices with behavior that fails to satisfy one or more behavioral policies will have their authorization revoked and will no longer have access to the secure multicast.

30 Claims, 6 Drawing Sheets

DIRECT AUTHORIZATION

FIG. 5A

MEDIATED AUTHORIZATION

FIG. 5B

ENDPOINT CREDENTIALING

FIG. 5C

FIG. 6

VERIFYING INTEGRITY OF NETWORK DEVICES FOR SECURE MULTICAST COMMUNICATIONS

This application claims the benefit of U.S. Provisional Application No. 61/088,931, filed Aug. 14, 2008, the entire content of which is incorporated herein by reference.

TECHNICAL FIELD

The invention relates to computer networks and, more particularly, to multicasting within a network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

In some instances, these packets may be directed to a single destination device in a type of communication referred to as a "unicast" communication. Many applications make use of unicast communications, such as web browsers that communicate via the HyperText Transfer Protocol (HTTP). Unicast communications (or "unicasting"), however, may not be appropriate for all applications, especially those that deliver substantially the same content at substantially the same time to a plurality of destination devices, such as Internet Protocol Television (IPTV), web-conferencing, video conferencing, and other multi-user applications. For these multi-user applications, the use of unicast communications would require delivery of the same content multiple times, i.e., a separate transmission for each destination device, which would unnecessarily consume network bandwidth and strain server resources. As a result, a form of communication referred to as "multicast" communication or "multicasting" was developed to address this unnecessary consumption of network resources.

Multicasting may involve using network devices to replicate data packets for receipt by multiple recipients and thereby reduce the transmission burden on the sender, leading to scalability and more efficient packet delivery. A sender of multicast communication transmits multicast packets to a single address, the multicast group address. Recipients may request to "join" the multicast group in accordance with a protocol, such as the Internet Group Management Protocol (IGMP). If the request is granted, packets sent to the group address are replicated by the network devices of the network and forwarded to the address of the joined recipient, along with all other previously joined recipients. Because the network efficiently replicates multicast packets at these network devices, multicasting may reduce the redundant transmission that may occur when transmitting data for the above multi-user applications.

SUMMARY

In general, techniques are described for verifying the integrity of network devices seeking authorization to access secure multicast communications. That is, prior to granting a network device access to secure multicast communications, integrity verification is performed on the network device so as to ensure that the network device has not been compromised. Moreover, the integrity verification can be integrated within a secure multicast system so as to be implemented in conjunction with authentication of the network device. In this way the techniques can be used to confirm that sensitive multicast communications can be securely transmitted to the authenticated network device without concern that malicious software on the network device may duplicate, redirect or otherwise compromise the security of the communications.

For example, an endpoint device being verified and authenticated for joining a secure multicast group is first required to generate a health status report detailing its configuration. The health status report may include such information as the presence or absence of malicious software (e.g., a virus or spyware), whether the endpoint device has an invalid configuration, and/or whether the endpoint has countermeasures installed (e.g., anti-virus software). A multicast access control server of the secure multicast system grants or denies authorization to the endpoint device to decrypt a secure multicast based on a comparison of the contents of the received health status report with stored enterprise policies. In addition, the multicast access control server may also require integrity verification of the multicast server sourcing the multicast content. The multicast access control server may similarly grant or deny authorization to the multicast server to encrypt and transmit multicast messages based on a comparison of the contents of a health status report from the multicast server with stored enterprise policies.

Upon authorization, the secure multicast system provides the endpoint devices with keying material needed to decrypt and analyze secure multicasted data. Likewise, the secure multicast system provides the multicast server with keying material needed to encrypt the data to be multicasted upon confirmation that the multicast server is configured in such a manner as to satisfy the stored policy. The multicast access control server may monitor the endpoint devices during the multicast and may revoke their authorization based on a comparison of their behavior with stored behavior policies. Similarly, the multicast access control server may monitor the multicast server and revoke its authorization to encrypt messages based on a comparison of its behavior with stored behavior policies.

In one embodiment, the invention is directed to a method for receiving a request for access to secure multicast content, after receiving the request and prior to providing access to the secure multicast content, determining, with a first network device, whether characteristics of a second network device satisfy one or more health policies, wherein the one or more health policies each include information describing acceptable characteristics for a network device, and sending credentials to the second network device when the characteristics of the second network device satisfy the one or more health policies, wherein the credentials provide access to the secure multicast content.

In another embodiment, an access control device comprises a communication module that receives, from a network device, a request for access to secure multicast content, one or more health policies, wherein the one or more health policies each include information describing acceptable characteristics for a network device, and an authorization module that comprises a health evaluation module that determines, after receiving the request and prior to providing access to the secure multicast content, whether characteristics of the network device satisfy the one or more health policies, wherein the communication module sends credentials to the network device when the characteristics of the network device satisfy the one or more health policies, wherein the credentials provide access to the secure multicast content.

In another embodiment, the invention is directed to a computer-readable medium containing instructions. The instructions cause a programmable processor of an access control device to receive, from a network device, a request for access to secure multicast content, after receiving the request and prior to providing access to the secure multicast content, determine, with the access control device, whether characteristics of the network device satisfy one or more health policies, wherein the one or more health policies each include information describing acceptable characteristics for a network device, and send credentials to the network device when the characteristics of the network device satisfy the one or more health policies, wherein the credentials provide access to the secure multicast content.

In another embodiment, a system comprises an endpoint device, a multicast server, and an access control device. The multicast server encrypts and sends secure multicast content. The access control device includes one or more health policies, wherein the one or more health policies each include information describing acceptable characteristics for a network device, a cryptographic key that is able to decrypt the multicast content sent by the multicast server, a communication module to receive a request for access to secure multicast content from the endpoint device, and to send the cryptographic key to the endpoint device when the characteristics of the endpoint device satisfy the one or more health policies, and a health evaluation module to determine, after receiving the request and before the communication module sends the cryptographic key, whether characteristics of the endpoint device satisfy the one or more health policies.

The techniques described herein may provide one or more advantages. For example, even where the identity of an endpoint device is known and the endpoint device is properly authorized to receive secure multicast data, malicious software agents or other instruments could permit unauthorized parties to gain access to data received by the endpoint device once the data is decrypted. Use of the techniques described herein increases the probability that each network device is free from the influence of unauthorized parties before the network device is permitted access to secure multicasted communication. In this manner, confidential, sensitive, or rights-protected data may be protected from compromise in the event one or more devices that are members or prospective members of a multicast group have been compromised by malicious or otherwise unauthorized software agents.

In addition, verifying the integrity of the multicast server as a prerequisite to secure multicasting may increase the probability of maintaining data integrity. That is, the required integrity verification techniques may prevent unauthorized parties from accessing and compromising the multicast server, thus preventing those parties from being able to modify the data before it is encrypted and sent to the endpoint devices admitted to the multicast group.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
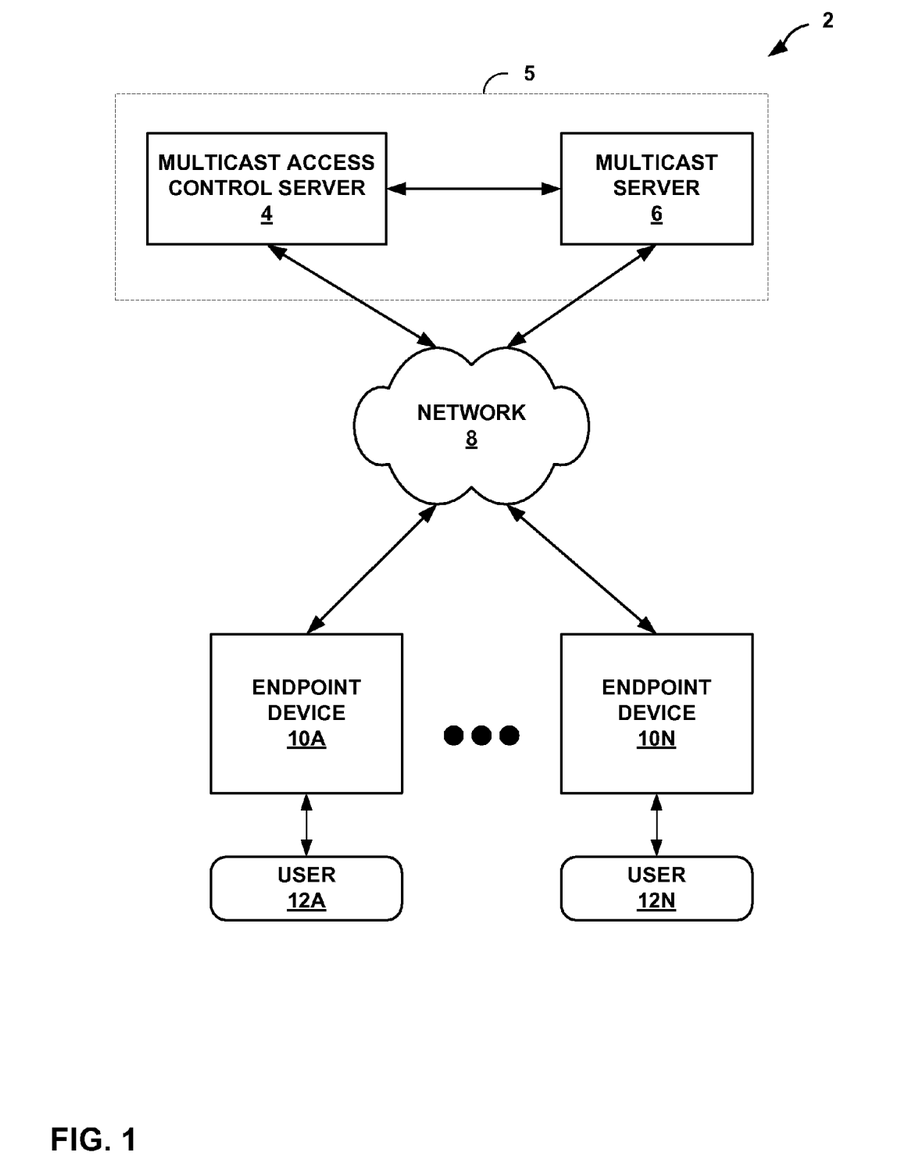
FIG. 1 is a block diagram illustrating an exemplary system that implements the multicast integrity verification techniques described in this disclosure.

FIG. 1 is a block diagram illustrating an exemplary network system 2 that implements the multicast integrity verification techniques described in this disclosure. In the example of FIG. 1, network system 2 includes a plurality of endpoint devices 10A-10N ("endpoint devices 10") coupled to a network 8. Each of endpoint devices 10 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with and communicating over network 8. Each of endpoint devices 10 may provide an interface (e.g., display, speakers, keyboard, mouse, and the like) with which respective users 12A-12N ("users 12") interact to access content provided by network 8.

Network 8 may include a plurality of network devices (not shown in FIG. 1) that facilitates the access of content by endpoint device 10. Each of the plurality of network devices may comprise one of a router, a switch, a server, a database, a hub, a firewall, a detection intrusion/prevention (IDP) device and/or any other type of networking equipment or device that facilitates the transfer of data to and from endpoint device 10.

Network 8 may transmit content to endpoint devices via one or more packet-based protocols, such as an Internet Protocol (IP)/Transmission Control Protocol (TCP). In this respect, network 8 may support the transmission of data via discrete data units, often referred to as "packets." As a result, network 8 may be referred to as a "packet-based" or "packet switched" network. While described in this disclosure as transmitting, conveying, or otherwise supporting packets, network 8 may transmit data according to any other discrete data unit defined by any other protocol, such as a cell defined by the Asynchronous Transfer Mode (ATM) protocol. The network devices may support a protocol, such as the Internet Group Management Protocol (IGMP), that facilitates multicasting. IGMP, for instance, is used by network devices to establish and manage network multicast group memberships. IGMP is also used to connect endpoint devices 10 and a multicast server 6 to network devices in network 8 that support multicast communication.

In addition, network 8 may comprise a public network, such as the Internet, a private network, such as those owned and operated by an enterprise, or a combination of both public and private networks. Network 8 may further comprise one or more Wide Area Networks (WANs), Local Area Networks (LANs), Virtual Local Area Networks (VLANs), Virtual Private Networks (VPNs), and/or any another type of network. In some instances for example, network 8 comprises a large public WAN, such as the Internet, over which a number of private networks owned by the same enterprise communicate to form a VPN. Thus, although shown as a single network 8 in FIG. 1, network 8 may comprise any number of interconnected networks, either public or private, in which the various networks interconnect to form various virtual networks.

Typically, users 12 direct respective endpoint devices 10 to access network 8 and receive multicast content from multicast server 6. In some embodiments, however, an endpoint device 10 autonomously accesses network 8. As described herein, prior to granting an endpoint device 10 access to multicast content, secure multicast system 5 requires each of the endpoint devices to perform an integrity verification so as to ensure that the endpoint device has not been compromised. Moreover, the integrity verification can be integrated in conjunction with individual authentication of the endpoint devices 10. In this way the techniques can be used to confirm that sensitive multicast communications can be securely transmitted to endpoint devices 10 without concern that malicious software on the network device may duplicate, redirect or otherwise compromise the security of the communications.

Example multicast applications include video games, Voice over Internet Protocol (VoIP), Internet Protocol Television (IPTV), video-telephony, video-conferencing, internet teleconferences, online web-based meetings, archived video playback, multicast messaging (e.g., "Twitter"), software update rollouts, and other applications that typically presents content concurrently, simultaneously, or "live" to a plurality of devices. As a result, multicast communications were developed and most networks, including network 8, support multicast communications.

For example, multicasting typically involves using the network devices of network 8 (e.g., routers) to replicate data packets for receipt by multiple recipients and thereby reduce the transmission burden on multicast server 6 and intermediate portions of network 8. Any of endpoint devices 10 may request to "join" a network multicast group (not shown) in accordance with a protocol, such as the Internet Group Management Protocol (IGMP) described above. The network multicast group, as used herein, comprises a list of a subset of endpoint devices 10 and is maintained by network 8. If network 8 grants the join request, the requesting one of endpoint devices 10 becomes a member of the network multicast group. Each network multicast group is associated with a single multicast group address established within network 8. In a typical multicast session, multicast server 6 transmits multicast packets to a multicast group address. Packets sent to the multicast group address are replicated by the network devices of network 8 and forwarded to all members of the network multicast group associated with the multicast group address. Because network 8 efficiently replicates multicast packets, multicasting may reduce the redundant transmission that may occur when transmitting data for the above multi-user applications.

Multicast server 6 may be a high-end server, a personal computer, a laptop computer, a data center, an application server, a digital video camera, an intermediate network device, a network appliance, a supercomputer, a mainframe computer, a telephone handset, a microphone, or another type of device capable of sourcing multicast content over network 8. Multicast server 6 typically includes one or more microprocessors that provide an operating environment for one or more software module for generating and outputting multicast content. In some embodiments of network system 2, there may be a plurality of multicast servers that generate and output multicast content.

Multicast server 6 stores or otherwise sources content, which, as used herein, refers to any data commonly transmitted and/or stored within a network, such as web-based applications, images, documents, web pages, video data, audio data such as voice, web-based games, scripts, or any other type of network-based content. Content available on multicast server 6 may be confidential, sensitive, or rights-protected. Such content may be sent for the purpose of, for example, web and videoconferencing, stock quote streaming, streaming television, and other applications.

For reasons relating to information origin authentication, confidentiality and integrity, a content-provider may deploy secure multicast system 5 in which multicast server 6 outputs multicast communications in a secure format that can only be decrypted by endpoint devices 10 that are members of a secure multicast group. The secure multicast group denotes those endpoint devices 10 that are authorized by secure multicast system 5 to receive keys useful for decrypting and analyzing received packets. The secure multicast group is distinct from the network multicast group maintained by network 8. The identities and addresses of endpoint devices 10 that are members of the secure multicast group are maintained in a secure multicast group membership table in multicast server 6 (not shown in FIG. 1).

For example, multicast server 6 may encrypt the payload of multicast packets and output the multicast packets to the corresponding multicast group address. The internal devices (e.g., routers) of network 8 replicate the secure communications in accordance with a multicast tree and send the packets to any of endpoint devices 10 that are members of the network multicast group associated with the multicast group address. Multicast server 6 encrypts the content using a group key generated and distributed by multicast access control server 4. Where multicasted content is sufficiently secured by encryption, it is unintelligible to any of the receiving endpoint devices 10 or any other devices that are not members of the secure multicast group and thus lack the appropriate decryption key. If secure multicast system 5 uses symmetric keys, for example, the appropriate decryption key is the same as the group key used by multicast server 6 for encryption.

In another example, prior to outputting a multicast packet, multicast server 6 may calculate a cryptographic hash of the packet payload using a cryptographic hash function and an integrity key. The calculated hash is appended to the packet payload, and the modified packet is output to a multicast group address. By re-calculating a hash of the packet payload using the identical cryptographic hash function and integrity key used by the multicast server, a receiving endpoint device 10A can compare the recalculated and appended hashes to determine whether the payload has been modified, destroyed, or lost. Alternative methods for ensuring data integrity known in the art, such as those involving asymmetric keys, may also be used.

In yet another example, prior to outputting a multicast packet, multicast server 6 may calculate a message authentication code (MAC) using a cryptographic hash function and an origin authentication key. The MAC is appended to the packet payload, and the modified packet is output to a multicast group address. Upon receiving the modified packet, an endpoint device 10A recalculates the MAC using the cryptographic hash function and origin authentication key used by the multicast server. By comparing the recalculated MAC to the received MAC, endpoint device 10A can determine whether the packet originated from the claimed sender. Alternative methods for performing origin authentication, such as those involving asymmetric keys, may also be used.

Multicast access control server 4 authenticates endpoint devices 10 so as to confirm that any endpoint device requesting to join a particular secure multicast group has permission to join the secure multicast group. At this time multicast access control server 4, possibly in conjunction with multicast server 6, require and implement an integrity verification to confirm that any endpoint device requesting to join a secure multicast group has not been compromised by malicious or unauthorized software. In addition, secure multicast system 5 may also require integrity verification of the multicast server 6 sourcing the multicast content to ensure that the multicast server 6 has not been compromised. Multicast access control server 4 may be one of a wide variety of different types of devices. For example, multicast access control server 4 may be a policy server, a key server, a firewall device, an intermediate network device, an Internet Protocol Security gateway device, or any other type of device that controls access to keying material. Furthermore, in some implementations, the functionality of multicast access control server 4 may be divided among several devices. Multicast access control server 4 may be connected directly to multicast server 6, as shown in FIG. 1, or it may communicate to multicast server 6 via network 8. Multicast access control server 4 may be a software or hardware module running on the same device as multicast server 6, or it may be a separate device.

Multicast server 6 and endpoint devices 10 may contain any of a number of security vulnerabilities and/or be compromised in any of a number of different ways. For example, endpoint device 10A may constitute a security risk to a secure multicast session if a most recent version of the antivirus software application or most recent virus definitions has not been installed on the endpoint device. In such a case, endpoint device 10A may be infected with a computer virus or other malicious agent that may forward decrypted confidential multicast content to unauthorized recipients.

In another example, an endpoint device 10A may constitute a security risk if the most recent operating system patch has not been installed on the endpoint device 10. A prior version of the operating system may include a known security flaw that can be exploited by a hacker so as to view decrypted confidential multicast content. In another example, endpoint device 10A may be compromised in that it may contain one or more known malicious or unauthorized software agents (e.g. spyware, viruses, keystroke loggers, or unauthorized software having known vulnerabilities), and those unauthorized software agents may have access to any secure multicast content that is legitimately received and decrypted by the endpoint device.

In another example, multicast server 6 may similarly be compromised by containing one or more malicious or unauthorized agents. For example, an unauthorized agent installed on multicast server 6 may insert disinformation into the multicast content or alter existing multicast content sourced by the multicast server, thereby violating the integrity of the multicast content before the content is encrypted and transmitted by the multicast server. Endpoint devices 10 that receive encrypted disinformation in the form of secure multicast content may have no means for determining that the content is not, in fact, authorized. In addition, an unauthorized software agent installed on multicast server 6 may simply send unsecured multicast content to an unauthorized user or device before the content is encrypted. Alternatively, an unauthorized agent may forward one or more keys to an unauthorized user or device for decryption and viewing of sensitive content.

In one example, secure multicast system 5 provides secure multicast communications by encrypting the multicast content prior to transmission as a multicast packet stream. In such an embodiment, multicast server 6 obtains a group key for the particular multicast session from multicast access control server 4 and uses the group key to encrypt multicast content. Authorized endpoint devices 10 attempting to join the particular multicast group participate in a handshake for authenticating themselves to multicast access control server 4. For example, to participate in a secure multicast, endpoint device 10A outputs a join request to secure multicast system 5 that specifies a particular secure multicast group. The join request informs secure multicast system 5 that endpoint device 10A is interested in decrypting secure messages sent to a particular multicast group address. Thereupon, multicast access control server 4 requests authentication prior to allowing endpoint device 10A to join the particular secure multicast group. The endpoint device may authenticate itself to the multicast access control server by responding with pre-provisioned credentials or other secure identification data. In addition, authentication may require that the corresponding user 12 for the endpoint device provide, for example, a user name and password, digital certificate, biometric or other information.

Further, when one of endpoint device 10 requests membership in a secure multicast group, multicast access control server 4 requires an integrity verification of the requesting endpoint device 10 before allowing the group key for the multicast session to be distributed to the requesting endpoint device. That is, in addition to authenticating the requesting endpoint device 10, the requesting endpoint device is required to provide a health status report so as to verify that its present configuration satisfies predetermined health policies stored on multicast access control server 4. In this way, verification of the integrity of endpoint device 10 may be performed in conjunction with a validation of the identity of endpoint device 10 or user 12.

For example, as part of the verification process, the endpoint device 10 sends a health status report to secure multicast system 5 providing a detailed inventory of its current configuration, including the software agents that are installed on the endpoint. The health status report may comprise one or more messages that indicate the health status of the requesting endpoint device. As used herein, the term "health status" refers to a configuration of the endpoint device. Generally, the relevant configuration for the device is a software configuration and operating environment provided by the endpoint device. For example, the health status of the endpoint device may indicate whether the endpoint device is currently using the most recent version of an antivirus software application or the most recent virus definitions. In another example, the health status of multicast server 6 may indicate whether the most recent operating system patches have been installed. In another example, the health status may directly indicate that multicast server 6 is compromised, containing one or more known malicious or unauthorized agents.

In general, multicast access control server 4 compares the health status report of endpoint 10A with one or more stored enterprise policies to determine whether the health status report for the endpoint conforms to or otherwise satisfies the security requirements of the enterprise. If the health status report satisfies the requirements of the stored policies, multicast access control server 4 permits the requesting endpoint device 10 to join the particular secure multicast group and allows the group key to be distributed to the newly joined endpoint device.

Upon authentication and successful integrity verification of a requesting endpoint device, multicast access control server 4 or multicast server 6 communicates the group key for the multicast session to the authorized endpoint device 10, thereby allowing that endpoint device to decrypt the secure multicast content and present the content to the corresponding user 12. Distribution of a group key may occur, for example, through use of a public key architecture, by securely unicasting the new group key to each intended recipient, or by other secure means. Multicast access control server 4 or multicast server 6 may communicate origin authentication and integrity keys in addition to the group key.

In some embodiments, multicast access control server 4 requires an integrity verification of multicast server 6 prior to allowing multicast server to commence distributing encrypted content for a new multicast session. That is, before the multicast server 6 is provided a key with which to encrypt multicast content, multicast server 6 may be required to similarly provide a health status report so as to verify that its present configuration satisfies the predetermined health policies stored on multicast access control server 4. For example, as part of the verification process, multicast server 6 sends a health status report to multicast access control server 4. Upon successful completion of the integrity verification, multicast access control server 4 provides multicast server 6 with a group key, integrity key, origin authentication key, or other keying material necessary to source the new multicast session in a secure form. Multicast server 6 encrypts multicast content using the group key prior to sending the content to the multicast group address. The multicast server may also use the integrity key to perform a cryptographic hash or other function to create a digest of the multicast content that may used by the recipient to verify the integrity of the packet payload. In addition, the multicast server may use the origin authentication key to create, for instance, a MAC for the multicast content Further, multicast access control server 4 may monitor the behavior of multicast server 6 and endpoint devices 10. This technique may be performed in conjunction with the analysis of the health status report, providing an additional measure of security during the verification step. For example, during a multicast session, multicast access control server 4 or agent software installed on the endpoints may observe network traffic sent from the endpoint devices as well as any other actions that may indicate that one or more of the endpoint devices has been compromised and is, for example, forwarding decrypted confidential multicast content to an unauthorized recipient. In another example, multicast access control server 4 may use port-scanning techniques to identify the presence of malicious agents on endpoint devices 10 during a multicast session. In addition, multicast access control server 4 may request from any of endpoints 10 an updated health status report at any time during the delivery of secure multicast content. In this way, the integrity verification techniques, including health status report analysis as well as behavior monitoring, may also be continually performed after multicast server 6 is authorized to source secure multicast content and after any of endpoint devices 10 becomes a member of the secure multicast group.

If multicast access control server 4 determines that a device that is a member of the secure multicast group is compromised, the multicast access control server may revoke the membership of the compromised device in the secure multicast group. Because the compromised device still possesses the various keys used for decrypting and analyzing confidential multicast content, multicast access control server 4 distributes new group, integrity, and origin authentication keys, in a process known as "re-keying," to the remaining devices in the secure multicast group.

In some embodiments, secure multicast system 5 may establish one or more security levels that correspond to the importance or sensitivity of the multicast content being sourced by multicast server 6. Some multicast applications may require a high degree of integrity among endpoint devices 10 to assure the confidentiality of multicasted content. Other multicast applications may be routine and require a lesser degree of confidence in the integrity of endpoint devices 10. Multiple authorization levels may be implemented so as to indicate the level of authorization granted to specific secure multicast group members. Moreover, multicast access control server 4 may require increasing levels of integrity verification for the increasing levels of security levels associated with the content. As part of the verification process where multiple security levels are involved, multicast access control server 4 compares the health status report of endpoint device 10A with one or more health policies that correspond to the one or more authorization levels, where more stringent health policy requirements generally provide more exclusive authorization levels and place more stringent requirements on the endpoint devices. At higher levels, for example, endpoint devices may be required to include hardware-based trust platforms and other security devices. In some cases, multicast access control server 4 generates distinct keys for each level of authorization, and endpoint device 10A receives the key corresponding to its level of authorization. Endpoint device 10A may also receive keys corresponding to levels of authorization lower than its own. In this manner, endpoint device 10A has the keys necessary to decrypt and analyze any multicast content with a security level at or below its own authorization level.

Figure 2:
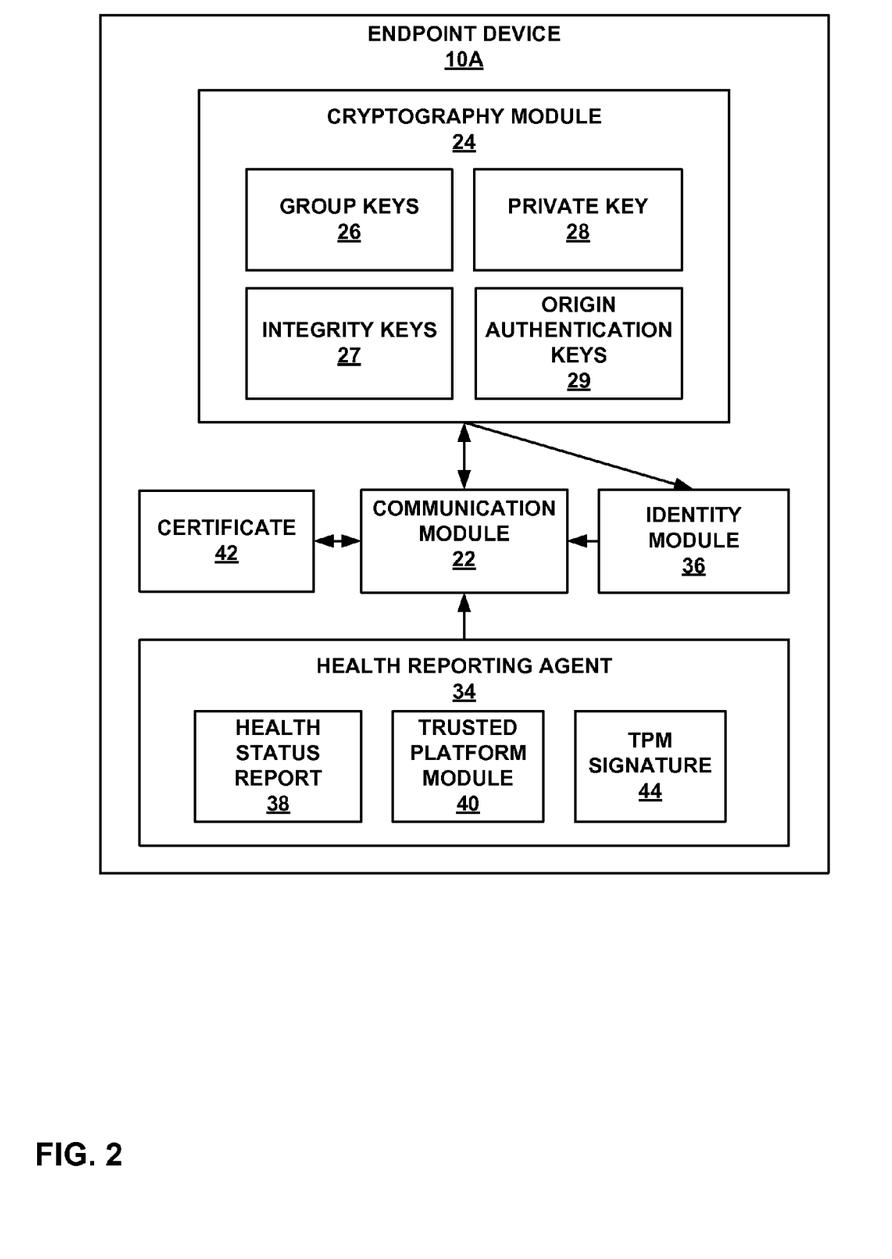
FIG. 2 is a block diagram illustrating exemplary details of an endpoint device for the system of FIG. 1.

FIG. 2 is a block diagram illustrating, with exemplary details, one embodiment of endpoint device 10A. As described above, endpoint device 10A is generally a computing device (e.g., a personal computer or appliance) providing an operating environment for a plurality of hardware and software modules. Other endpoint devices 10 may comprise similar modules to those described below with respect to endpoint device 10A in order to implement the multicast integrity verification techniques described herein. For purpose of clarity, components, such as a microprocessor, memory, keyboard, display, an operating system and components commonly found in a computing device or appliance are not shown in FIG. 2

In the example of FIG. 2, endpoint device 10A includes communication module 22, cryptography module 24, and health status reporting agent 34, which may be implemented as software instructions. Endpoint device 10A may also include trusted platform module ("TPM") 40 for providing hardware-based enforcement that only trusted software is executed by the endpoint device. Communication module 22 provides network communication functionality for endpoint device 10A. For example, communication module 22 may be a kernel-level software component that provides a TCP/IP stack and any required network drivers for communicating with a packet-based network via a network interface card. Other forms of communication modules may be employed for communicating with other forms of networks, such asynchronous transfer mode (ATM) networks, satellite networks, optical networks or any other form of network by which multicast data may be provided.

Cryptography module 24 includes software instructions for enabling endpoint device to apply cryptographic techniques necessary for processing secure multicast communications and producing decrypted content. For example, cryptographic module 24 typically includes a set of one or more group keys 26, a set of one or more integrity keys 27, a set of one or more origin authentication keys 29, and optionally a private key 28 that is unique to endpoint device 10A. Private key 28 may be used in a public-key exchange to authenticate endpoint device 10A (e.g., by way of a digital signature) so as to permit endpoint device 10A to securely receive additional group, integrity, and origin authentication keys, certificates (illustrated in FIG. 2 as certificate 42), and other data. Group keys 26 permit cryptography module 22 to decrypt secure multicast content received by communication module 22. Integrity keys 27 permit cryptography module 22 to determine whether the secure multicast content has been modified, destroyed, or lost. Origin authentication keys 29, meanwhile, permit cryptography module 22 to determine whether the secure multicast content originated from the claimed sender. Each of group keys 26, integrity keys 27, and origin authentication keys 29 may correspond to a different secure multicast group. Alternatively, or in addition, each of group keys 26, integrity keys 27, and origin authentication keys 29 may correspond to a different authorization level granted to endpoint device 10A.

Identity module 36 represents software instructions and/or data necessary for authenticating endpoint device 10A when requesting access to a secure multicast session. For example, as discussed above, endpoint device 10A typically sends a join request for membership in a network multicast group to network 8. In addition, endpoint device 10A sends a request for membership in a secure multicast group to secure multicast system 5. In response to the membership request, multicast access control server 4 requires authentication of endpoint device 10A. As part of the request for membership in a multicast group, endpoint device 10A may be required by provide identifying information represented by identity module 26, which may include a digital signature, biometric, or user name and password when supplied by a user 12A. Alternatively, the endpoint device may authenticate itself to the multicast access control server by responding with pre-provisioned credentials or other secure identification data. This identity information may be used by multicast access control server during an identity validation step.

Health status reporting agent 34, included in example endpoint device 10A, is a software module or hardware module installed on endpoint device 10A that participates in the required integrity verification processes. That is, at the request of secure multicast system 5, health status reporting agent 34 collects configuration details of endpoint device 10A and generates health status report 38. As described in detail above, such configuration details can include information regarding the installation and version of any protective software (e.g. anti-virus software) on endpoint device 10A, the type and version of any operating system executing on endpoint device, status information with respect to the installation of all known patches for that operating system, certain registry values or other critical configuration information, an inventory of software applications installed on the endpoint, an inventory of any processes or threads currently being executed by the endpoint including names and current resource usage, or other information that may indicate presence or absence of malicious or other unauthorized software.

As an alternative, or in addition to sending a health status report, endpoint device 10A may use trusted platform module ("TPM") 40 to generate a TPM value that succinctly indicates a configuration of endpoint device 10A. TPM signature 44, based on a TPM value and a nonce value, is then generated to impede replay attacks. TPM signature 44 may be sent in response to a request for configuration details as part of an authorization protocol. TPM 40 comprises hardware built into endpoint device 10A that generates and stores values that cannot be altered by hardware modules or software applications outside TPM 40. TPM 40 may generate the TPM value by successively applying a hash function to the machine code instructions of various software applications before endpoint device 10A loads those software applications. Thus, the TPM value is a hash value associated with a specific configuration of important software on endpoint device 10A. Because it cannot be altered by hardware or applications outside endpoint device 10A, the TPM value as generated by TPM 40 increases the probability that endpoint 10A is accurately presenting a representation of its configuration, thereby providing an additional measure of verification.

When endpoint device 10A is granted authorization to access a secure multicast, it may be sent a new group key for the set of group keys 26. The new group key is used to decrypt the secure multicast content into readable form. A new group key may be encrypted using the publicly available public key of endpoint device 10A before being sent to endpoint device 10A. Because it is encrypted, the new group key cannot be used by a party that intercepts the message containing the new group key. Endpoint device 10A however, possessing the necessary private key 28 that corresponds to the public key of endpoint device 10A is able to decrypt and use the new group key. New keys for the sets of integrity keys 27 and origin authentication keys 29 may be sent and received in like manner.

Once endpoint device 10A is added by network 8 to the network multicast group, endpoint device 10A will begin receiving, from network 8, secure multicast messages sent to the corresponding multicast group address. Upon authorization and receipt of the requisite group key providing access, endpoint device 10A will decrypt the secure multicast messages into a readable form. Endpoint device 10A may deliver the decrypted multicast messages to the requesting hardware or software module on endpoint device 10A, or it may send or otherwise present the messages to user 12A. Prior to delivering the decrypted multicast messages, endpoint device 10A may verify the integrity of the messages using one of integrity keys 27 or authenticate the origin of the messages using one of origin authentication keys 29.

In some cases, endpoint device 10A may store a certificate 42, which may be generated by multicast access control server 4 upon verifying the integrity of endpoint device 10A. Certificate 42 may include a timestamp indicating the date and time the multicast access control server 4 verified the integrity of endpoint device 10A, and the contents of certificate 42 may be encrypted so that the contents cannot be altered by malicious software running on the endpoint. Endpoint device 10A may send certificate 42 to secure multicast system 5 in combination with a request to join a secure multicast group. Alternatively, endpoint device 10A may send certificate 42 to secure multicast system 5 in response to a request for a health status report or a certificate. Where the certificate remains valid, in that it has yet to expire or otherwise become obsolete, and upon authentication of the endpoint, the receiving device sends a group key to endpoint device 10A providing access to a secure multicast. In this way a redundant integrity verification process may be avoided in the event the integrity endpoint device 10A has recently been verified. Example expiration periods for certificate 42 may be on the order of seconds or minutes, (e.g., 1 to 30 minutes).

The modules described above with respect to endpoint device 10A may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. If implemented in software, the functions may be stored as one or more instructions or code on a computer-readable storage medium. By way of example, and not limitation, such computer-readable media can comprise random-access memory (RAM), read-only memory (ROM), electrically-erasable programmable read-only memory (EEPROM), compact disc read-only memory (CD-ROM), optical disk storage, magnetic disk storage or other magnetic storage devices, or any other medium that can be used to store desired program code in the form of instructions or data structures and that can be accessed by a computer. Storage media may store the executable software instructions in the form of computer program products.

Figure 3:
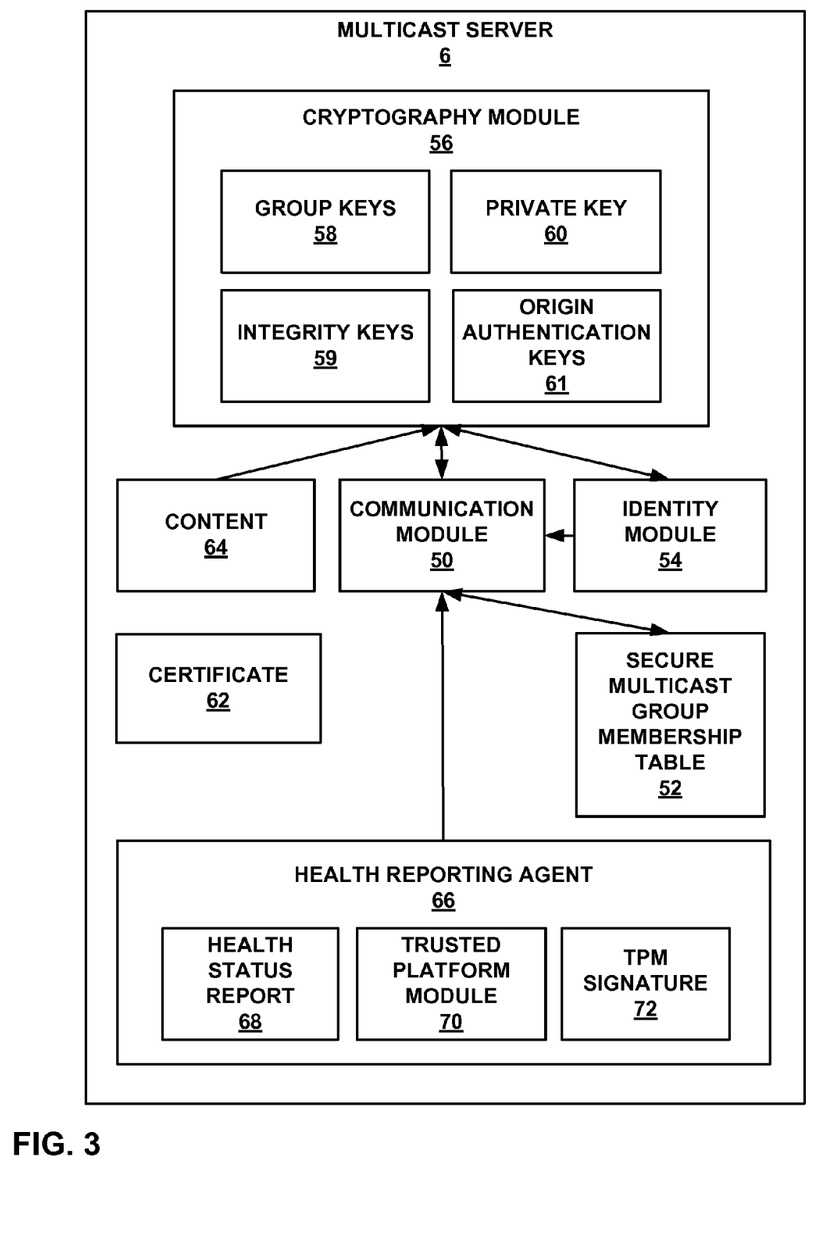
FIG. 3 is a block diagram illustrating exemplary details of a multicast server for the system of FIG. 1.

FIG. 3 is a block diagram illustrating, with exemplary details, one embodiment of multicast server 6 of FIG. 1. As described above, multicast server 6 is generally a server, computing device or other appliance that includes one or more microprocessors that provide an operating environment for one or more software module for generating and outputting multicast content. For purpose of clarity, components, such as a microprocessor, memory, keyboard, display, an operating system, network drivers and other components commonly found in such a computing device or appliance are not shown in FIG. 3.

In the example embodiment of FIG. 3, multicast server 6 includes communication module 50, cryptography module 56, and health status reporting agent 66, which may be implemented as software instructions. All network communications involving multicast server 6 are sent or received by communication module 50. For example, communication module 50 may be a kernel-level software component that provides a TCP/IP stack and required network drivers for communicating with a packet-based network via a network interface card. Other forms of communication modules may be employed for communicating with other forms of networks, such asynchronous transfer mode (ATM) networks, satellite networks, optical networks or any other form of network by which multicast data may be provided.

Cryptography module 56 includes software instructions for enabling multicast server 6 to apply cryptographic techniques necessary for producing secure multicast communications carrying encrypted content. For example, cryptography module 56 may store a set of group keys 58, a set of integrity keys 59, a set of origin authentication keys 61, and a private key 60 that is unique to multicast server 6. Private key 60 may be used in a public-key exchange that permits multicast server 6 to securely transmit and receive additional group keys, certificates (illustrated in FIG. 3 as certificate 62), and other data. Group keys 58 permit cryptography module 50 to encrypt multicast content to be sent by communication module 50 to network 8. Digests calculated by cryptography module 50 using integrity keys 27 and appended to the message allow a message recipient to determine whether the secure multicast content has been modified, destroyed, or lost. Digests calculated by cryptography module 50 using origin authentication keys 29 and appended to the message, meanwhile, permit message recipients to determine whether the secure multicast content originated from multicast server 6.

In some embodiments, multicast server 6 seeking authorization to transmit a secure multicast may be required to send health status report 68 to multicast access control server 4 so as to verify the integrity of the multicast server. As part of the request for authorization, multicast server 6 may also send identifying information contained in identity module 54 to multicast access control server 4 to provide the identity of the multicast server. Examples of such identifying information include a digital signature, a stored server identifier and password, or other stored information. As an alternative, or in addition to sending a health status report, multicast server 6 may use TPM 70 to create TPM signature 72 and prove the execution of trusted software in a manner similar to the usage of TPM 40 by endpoint device 10A.

When multicast server 6 is granted authorization to transmit a secure multicast, it may be sent a new group key for the set of group keys 58. The new group key is used to encrypt content 64 before content 64 is transmitted to the multicast group address. Multicast server 6 may also receive one or more integrity keys for the set of integrity keys 27, as well as one more origin authentication keys for the set of origin authentication keys 29. Any of these received keys may be encrypted using the publicly available public key of multicast server 6 before being sent to multicast server 6 so as to protect the key during transmission from the secure multicast access control server to the multicast server. Because it is encrypted, the new key cannot be used by a party that intercepts the message containing the new key. Multicast server 6 however, possessing the necessary private key 60 that corresponds to the public key of multicast server 6, is able to decrypt and use the new key.

Using one of group keys 58, multicast server 6 may divide content 64 into messages, encrypt the messages, and send the encrypted messages to the multicast group address. In addition, the multicast server may calculate a digest of the message using one of integrity keys 27 and a separate digest using one of origin authentication keys 29; the multicast server then appends the one or more digests to the message. Network 8 replicates modified messages sent from multicast server 6 to the multicast group address and sends the replicated messages to members of the network multicast group.

In one embodiment, multicast server 6 maintains a secure multicast group membership table 52 that comprises a list of identities (e.g., addresses) of endpoint devices 10 that are authorized to access a secure multicast group. Multicast server 6 distributes group keys, integrity keys, and origin authentication keys received from multicast access control server 4 to endpoint devices 10 on the list so as to enable the endpoint devices to decrypt and analyze the secure messages. Multicast server 6 typically adds entries to secure multicast group membership table 52 in response to multicast access control server 4 providing an indication of the authentication and integrity verification of an endpoint requesting access. Secure multicast group membership table 52 may contain additional fields signifying the particular secure multicast group in which an endpoint device has a membership as well as the level of authorization obtained by an endpoint device. In an alternative embodiment, multicast access control server 4 maintains group membership table 52 and distributes keys to the endpoint devices.

In some cases, multicast server 6 stores a certificate 62, which may be generated by multicast access control server 4 upon verifying the integrity of the multicast server. Certificate 62 may include a timestamp indicating the date and time the multicast access control server 4 verified the integrity of multicast server 6, and the contents of certificate 62 may be encrypted so that the contents cannot be altered by malicious software running on the multicast server. Upon creating a new secure multicast group, multicast server 6 may send certificate 62 to multicast access control server 4. Where the certificate remains valid, in that it has yet to expire or otherwise become obsolete, multicast access controller server 4 sends one or more encryption keys (e.g., a group key) to multicast server 6 for sourcing encrypted multicast messages. In this way a redundant integrity verification process may be avoided in the event the integrity of multicast server 6 has recently been verified. Example expiration periods for certificate 62 may be on the order of seconds or minutes, (e.g., 1 to 30 minutes). In the event certificate 62 has expired, multicast access control server 4 declines to provide multicast server 6 the necessary encryption keys for the particular secure multicast group. In addition, multicast access control server 4 may decline to provide any address information for endpoint device 10 requesting to join the secure multicast group or may output one or more messages directing a network switch or router to block outbound multicast messages produced by multicast server 6. In some cases, secure multicast system 5 may quarantine multicast server 6, thereby effectively preventing the multicast server from communicating with other devices.

The modules described above with respect to multicast server 6 may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. If implemented in software, the functions may be stored as one or more instructions or code on a computer-readable storage medium.

Figure 4:
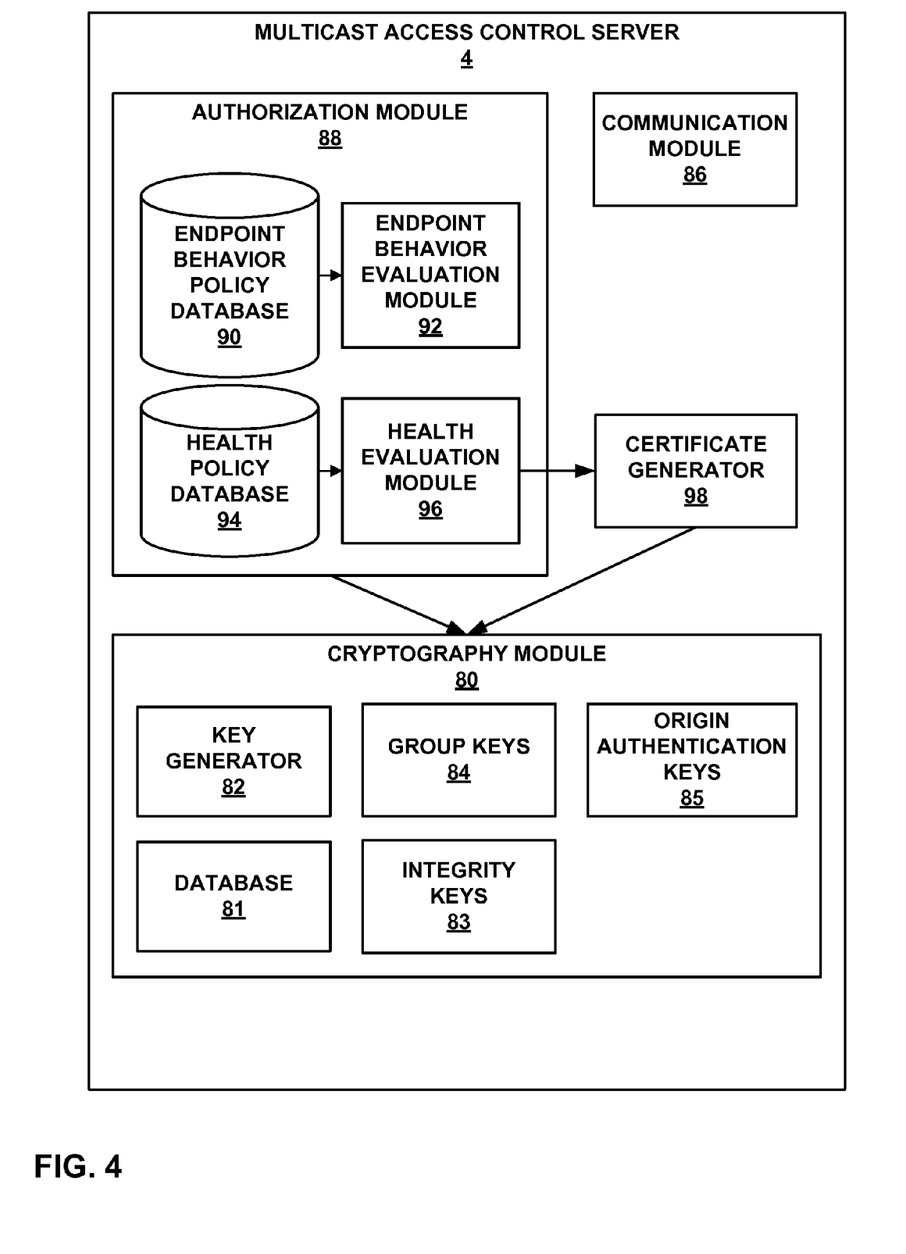
FIG. 4 is a block diagram illustrating exemplary details of a multicast access control server for the system of FIG. 1.

FIG. 4 is a block diagram illustrating an example embodiment of multicast access control server 4. As described above, multicast access control server 4 is generally a server, computing device or other appliance that includes one or more microprocessors that provide an operating environment for one or more software modules for orchestrating secure multicast communications, including maintaining and allocating cryptographic keys for multicast groups, and for authenticating endpoint devices 10 and possibly distributing the cryptographic keys to the authenticated devices so as to ensure access to the secure multicast content.

Multicast access control server 4 may receive with communication module 86 requests for authorization of endpoint device 10A or multicast server 6. Using communication module 86, authorization module 88 may request and receive a health status report for endpoint device 10A or multicast server 6. Upon receiving the health status report, health evaluation module 96 may determine whether endpoint device 10A or multicast server 6 has the requisite configuration by comparing the health status report to a health policy in health policy database 94. Health policy database 94 may include multiple health policies corresponding to multiple security levels. Alternatively, or in addition to requesting and receiving a health status report, multicast access control server 4 may request and receive a TPM value from endpoint device 10A or multicast server 6. Health evaluation module 96 compares the received TPM value with a value derived from a health policy in health policy database 94 to determine the authorization level for endpoint device 10A or multicast server 6. For purpose of clarity, components, such as a microprocessor, memory, keyboard, display, an operating system and components commonly found in a computing device or appliance, are not shown in FIG. 4.

In the example of FIG. 4, multicast access control server 4 includes a cryptography module 80, a communication module 86, an authorization module 88 and a certificate generator 98.

In general, cryptography module 80 stores and maintains cryptographic keys for use securing multicast communications. For example, cryptography module 80 includes a group key generator 82 and a set of one or more group keys 84, integrity keys 83, and origin authentication keys 85. Each of group cryptographic keys 84, integrity keys 83, and origin authentication keys 85 within its respective set corresponds to a different multicast group or a different security level within a multicast group. Multicast access control server 4 may be provisioned with the key sets by an administrator, or it may create them using group key generator 82. In one embodiment, cryptography module 80 includes a database 81 that stores data mapping group keys 84, integrity keys 83, and origin authentication keys 85 to identifiers associated with multicast groups, and possibly mapping the group keys to different security levels or even different individual endpoint devices for each of the multicast groups. Cryptography module 80 adds and removes entries within database 81 at the direction of authorization module 88.

In general, authorization module 88 handles authentication and integrity verification of individual endpoint devices 10 as those endpoints request to join secure multicast groups. In addition, authorization module directs cryptography module 80 so as to coordinate allocating and distributing cryptographic keys to the endpoints. In the example of FIG. 4, authorization module 88 includes a health evaluation module 96, a health policy database 94, an endpoint behavior evaluation module 92 and an endpoint behavior policy database 90. Health policy database 94 defines a set of one or more policies that define specific criteria to which an endpoint device 10 must conform to be considered for participation in a multicast group. For example, one policy may require that the endpoint have at least one of a defined set of permissible virus scanning applications installed. A second policy may specify that the virus definitions applied by those applications be current within a defined time period, such as one week. A third policy may define permissible operating systems that can be installed on the endpoint devices, while additional policies may define the required patches for the different operation systems. Additional policies may define specific registry values, require enablement of software firewalls on the endpoint devices, or require that certain applications, such as applications known to be vulnerable to malicious software, not be installed on the endpoint. Other policies may define specific software "footprints" for known or typical malicious software, such as identifiers for threads or processes or resource consumption, that must be absent from the endpoint devices. The policies may be defined in the form of Boolean expression specifying criteria for satisfying the policy. Health policy database 94 may be a relational database and may store the policies and corresponding criteria and actions as entries within one or more tables. Moreover, health policy database 94 may organize the policies for retrieval and application based on security level of the endpoint device, network subnet of the endpoint device, a content type or rating associated with the multicast group or other category.

Upon authorizing an endpoint device 10, authorization module 88 directs health evaluation module 96 to verify the integrity of the endpoint device. At this time, health evaluation module 96 retrieves the pertinent policies from health policy database 94 and applies the policies to the health status report received from the endpoint device. If health evaluation module 96 determines that endpoint device 10A satisfies the policies, communication module 86 distributes the appropriate group key, integrity key, and/or origin authentication key to endpoint device 10A. Cryptography module 80 may encrypt the keys with the public key of endpoint device 10A prior to transmittal. Alternatively, the keys may be otherwise securely unicasted to endpoint device 10A. Similarly, health evaluation module 96 may be invoked to verify the integrity of multicast server 6.

As further illustrated in FIG. 4, multicast access control server 4 may include a certificate generator 98 capable of producing a date and time stamped certificate under the direction of health evaluation module 96. That is, health evaluation module 96 may invoke certificate generator 98 to produce a certificate (e.g., certificates 42, 62) upon verifying the integrity of an endpoint device or a multicast source.

As shown in FIG. 4, authorization module may further include a behavior evaluation module 92 and an endpoint behavior policy database 90 for determining whether the activities or communications of an endpoint device indicate the presence of malicious software. For example, monitoring agents installed within the endpoints or located within the network proximate to the endpoints may monitor and log inbound and outbound communications and forward log files periodically to behavior evaluation module 92. In another example, multicast access control server 4 or the software agents may use port-scanning techniques to test the ports of the endpoint devices in order to gain an indication of the ports on which software of the endpoints is communicating. Monitoring may occur prior to authorization for access to a secure multicast in response to a request for authorization. Monitoring may also occur after authorization to ensure continued compliance with an endpoint behavior policy. Endpoint behavior evaluation module 92 compares the behavior of, for instance, endpoint device 10A with one or more endpoint behavior policies from endpoint behavior policy database 90 so as to detect any suspicious activity. Endpoint behavior policy database 90 may store policies that define network traffic signatures of suspicious behavior, such as an indication that a device is forwarding data in response to receiving content via a secure multicast group.

The modules described above with respect to multicast access control server 4 may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. If implemented in software, the functions may be stored as one or more instructions or code on a computer-readable storage medium.

Figure 5A:
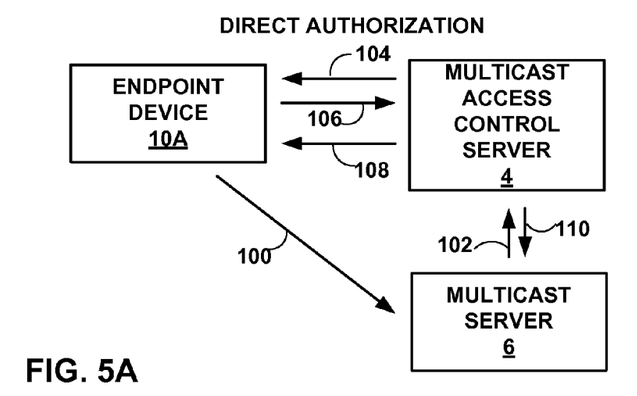
FIGS. 5A-5C are block diagrams illustrating example communications that may occur between the devices of FIG. 1 for various embodiments of integrity verification of an endpoint for secure multicast communications.
Figure 5B:
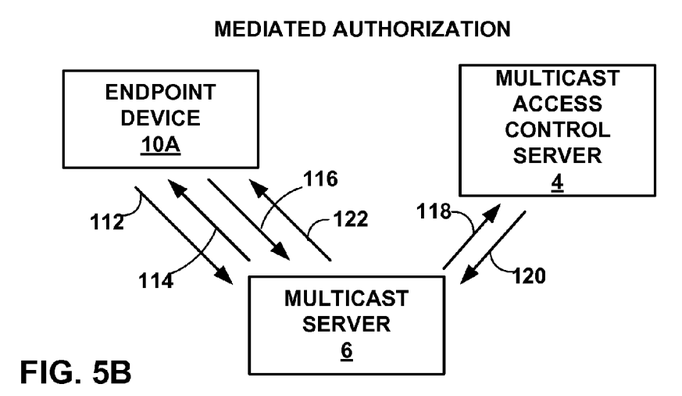
Figure 5C:
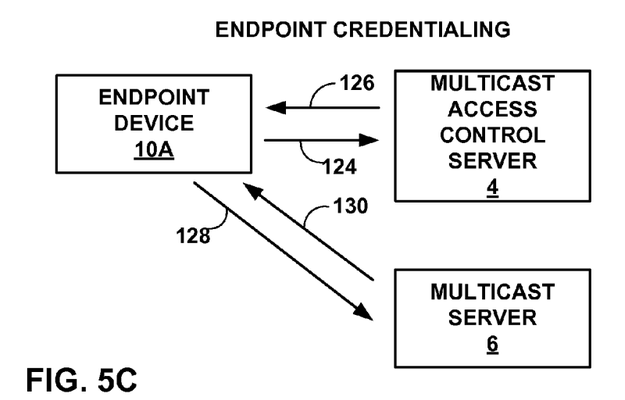

FIGS. 5A, 5B, and 5C are block diagrams illustrating three exemplary communication schemes in which integrity verification is integrated with the authorization of endpoint devices for secure multicast communications.

In the example embodiment of FIG. 5A, multicast access control server 4 directly communicates with endpoint device 10A for purposes of both authentication as well as integrity verification. Typically, endpoint device 10A outputs a multicast join request 100, which is forwarded by intermediate devices (e.g., multicast-enabled routers) to multicast server 6, which in turn sends a request 102 to multicast access control server 4 to authorize endpoint device 10A. In response, multicast access control server 4 sends a request or challenge 104 to endpoint device 10A. In response, endpoint device 10A outputs a response that combines both authentication information (e.g., a user identification, password, biometric, digital signature or other data) as well as a health status report or certificate 42 in a reply 106. Multicast access control server 4 analyzes the authentication information as well as the health status report as described herein. Upon both authorization and integrity verification, multicast access control server 4 sends a group key to endpoint device 10A in communication 108 and informs multicast server 6 that endpoint device 10A is authorized to receive secure multicast content in communication 110.

FIG. 5B illustrates an example embodiment in which multicast server 6 operates as a transparent mediator or proxy for the authorization of endpoint device 10A by multicast access control server 4. In this example, endpoint device 10A initiates using a join request 112 to multicast server 6, which responds with a request or challenge 114. In response, endpoint device 10A outputs a response 116 that combines both authentication information (e.g., a user identification, password, biometric, digital signature or other data) as well as a health status report or certificate 42, which multicast server 6 forwards to multicast access control server 4 in communication 118. Multicast access control server 4 analyzes authentication information as well as the health status report as described herein. Upon authorization, multicast access control server 4 sends a group key and notice of authorization to multicast server 6 in communication 120. Multicast server 6 forwards the group key to endpoint device 10A in communication 122.

In the example embodiment of FIG. 5C, endpoint device 10A receives credentials from multicast access control server 4 prior to requesting access to admission to any particular secure multicast group. In communication 124, endpoint device 10A sends authorization information and a health status report, together with a request for credentials, to multicast access control server 4. Upon both authorization and verifying the integrity of the endpoint device, multicast access control server 4 sends endpoint device 10A a certificate representing a satisfactory health status report in communication 126. When endpoint device 10A requires access to a secure multicast group, it sends a request for access together with the certificate in communication 128 to multicast server 6. Multicast server 6 provides a previously provisioned group key to endpoint device 10A in communication 130. In this example, the certificate serves to prove both that endpoint device 10A has been authorized and that the endpoint has passed an integrity verification process.

Figure 6:
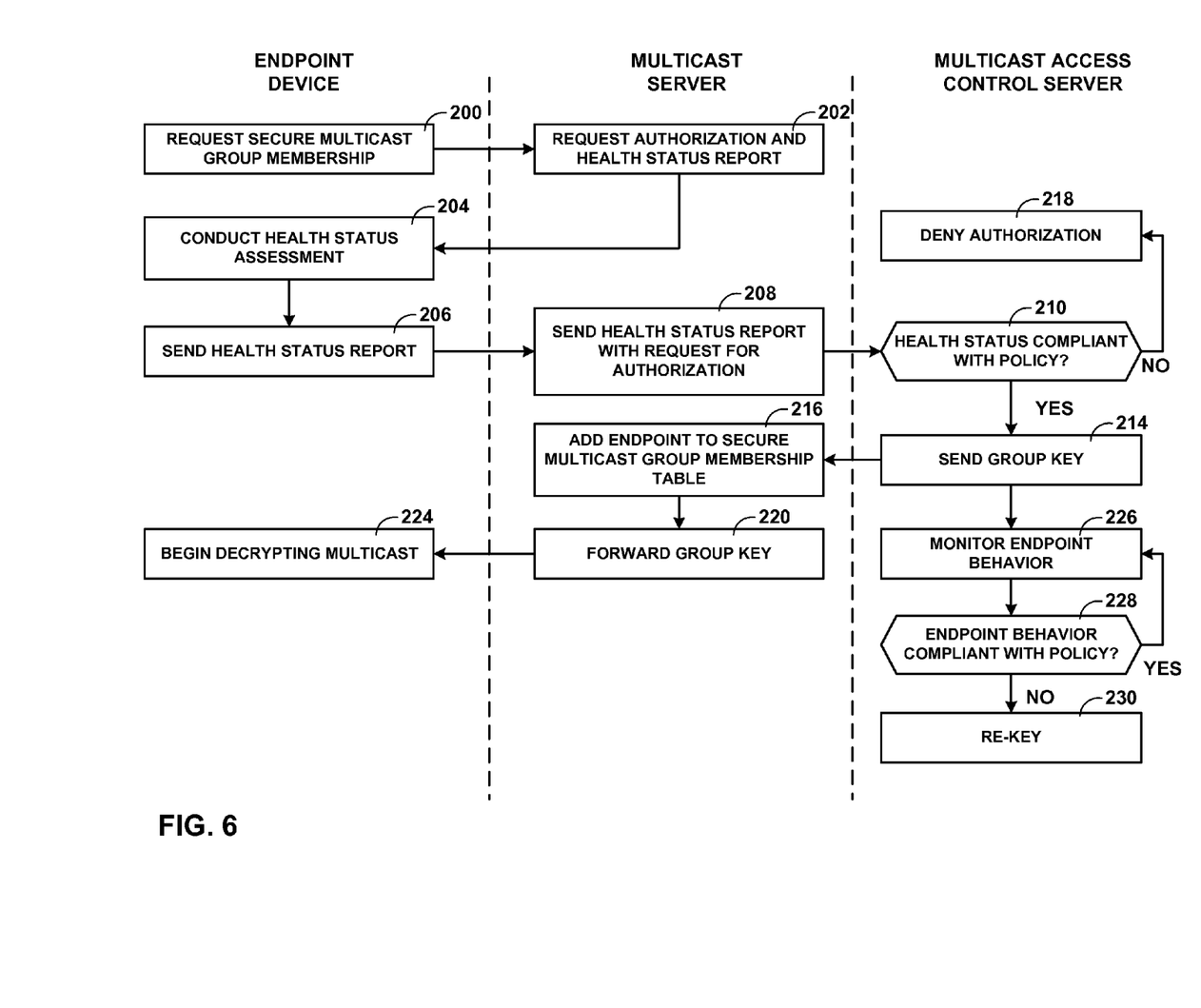
FIG. 6 is a flowchart illustrating exemplary operation of the network devices of FIG. 1 for verifying the integrity of endpoint devices for secure multicast communications in accordance with the techniques described herein.

FIG. 6 is a flowchart illustrating an exemplary operation of one embodiment of a network system in which integrity verification an endpoint is integrated within a secure multicast system. For purposes of clarity, the flowchart of FIG. 6 illustrates operation of the network system in an embodiment in which multicast server 6 operates as a transparent mediator or proxy for the authorization of endpoint device 10A by multicast access control server 4, such as shown in FIG. 5B.

Initially, endpoint device 10A outputs a request to join a secure multicast group 112 (200). Multicast server 6 responds to the join request by outputting a challenge to endpoint device 10A requesting that the endpoint device provide authentication information and a health status report (202). In response, health status reporting agent 34 of endpoint device 10A collects configuration details of the endpoint device to produce health status report 38 (204), and outputs a response that combines both authentication information from identity module 36 (e.g., a user identification, password, biometric, digital signature or other data) as well as health status report 38 (206). Alternatively, health reporting agent 34 may include certificate 42 in the reply without needing to generate health status report 38. Further, the health status report may be requested separately by multicast server 6 and supplied by endpoint device 10A in a response separate from the authorization information. Multicast server 6 forwards the authentication information as well as the health status report to multicast access control server 4 (208).

Authorization module 88 analyzes authentication information and invokes health evaluation module 96 to select and apply policies from health policy database 94 (210). Upon successful authorization and integrity verification, multicast access control server 4 sends to multicast server 6 a notice indicating the authorization and verification of the endpoint device and optionally a group key for encrypting the multicast content if the endpoint is the first to join the secure multicast group or security level of that group (214). Multicast server 6 adds endpoint device 10A to secure multicast group membership table 52 to keep track of devices that currently have access to particular secure multicasts (216). In addition, multicast server 6 outputs a response informing endpoint device 10A that the device has successfully joined the secure multicast group and includes in the response the group key provided by multicast access control server 4 (220), thereby allowing the endpoint device to begin decrypting multicast content (224).

Alternatively, if endpoint device 10A either fails authorization or fails the integrity verification process, multicast access control server 4 issues a message to multicast server 6 denying the join request (218). Multicast server 6 forwards the message to endpoint device 10A, thereby informing the endpoint that the join request has been declined. In response, the endpoint device may output warning messages informing the user that the multicast join request has been denied, possibly because the endpoint does not meet the security policies established by the enterprise and has thus failed the integrity verification process. At this point, the user may elect to perform one or more remedial operations on the endpoint device to bring the endpoint device into compliance.

Upon successful authorization and integrity verification of endpoint device 10A, behavior evaluation module 92 begins monitoring the activities and communications of the endpoint device to determine whether device behavior indicates the presence of malicious software (226). Endpoint behavior evaluation module 92 compares the behavior of endpoint device 10A with one or more endpoint behavior policies from endpoint behavior policy database 90 so as to detect any suspicious activity.

Where an endpoint device 10A fails to satisfy an endpoint behavior policy, multicast access control server 4 may direct multicast server 6 to remove the compromised endpoint device 10A from secure multicast group membership table 52. Because endpoint device 10A still possesses the group key used for decrypting confidential multicast content, multicast access control server 4 distributes a new group key (i.e., re-keys) to the remaining endpoint devices in secure multicast group membership table 52 (230). Multicast access control server 4 may request the list of members of secure multicast group membership table 52 from multicast server 6 in order to directly distribute the new group key to those members, or it may send a new group key to multicast server 6 with instructions to distribute it.

In addition, multicast access control server 4 may receive an instruction to revoke the membership of any of endpoint devices 10 in a secure multicast group. As in the above example, because endpoint device 10A still possesses the group key used for decrypting multicast content, multicast access control server 4 re-keys the remaining members in the secure multicast group.

Various embodiments of the invention have been described. For example, although described as secure multicast, the techniques may be applied to other multicast systems so as to verify the integrity of endpoint devices and/or multicast servers. These and other embodiments are within the scope of the following claims.

The invention claimed is:

1. A method comprising:
receiving a first request for access to secure multicast content by an endpoint device;
after receiving the first request and prior to providing access to the secure multicast content, determining, with a multicast access control server, whether characteristics of the endpoint device satisfy one or more health policies, wherein the one or more health policies each include information describing acceptable characteristics for a network device;
sending credentials from the multicast access control server to the endpoint device when the characteristics of the endpoint device satisfy the one or more health policies, wherein the credentials comprise a certificate indicating that the endpoint device has been verified by the multicast access control server to have a configuration that conforms to one or more health policies that must be satisfied before the endpoint device is allowed to receive secure multicast content, and wherein the certificate includes a timestamp indicating a date and time that the multicast access control server verified the configuration of the endpoint device;
receiving, with a secure multicast system, a second request for the secure multicast content, wherein the second request includes the certificate for the second network device;
determining, with the secure multicast system and based on the timestamp, whether the certificate is valid; and
sending a cryptographic key to the endpoint device when the certificate is valid for decryption of the secure multicast content.

2. The method of claim 1, wherein determining, with a first network device,
whether characteristics of a second network device satisfy one or more health policies comprises:
receiving a health status report for the second network device, wherein the health status report comprises information describing a configuration of the second network device; and
comparing the health status report with the one or more health policies to determine whether the health status reports indicates that the configuration of the second network device conforms to the health policies that must be satisfied before the second network device is allowed to receive secure multicast content.

3. The method of claim 2,
wherein the health status report includes a trusted platform module ("TPM") signature comprising a TPM value and a nonce value,
wherein determining whether characteristics of a second network device satisfy one or more health policies comprises determining whether the TPM value is associated with an acceptable configuration, the nonce value is acceptable, and the TPM signature is valid, and
wherein sending the credentials to the second network device further comprises sending the credentials when the TPM value is associated with an acceptable configuration, the nonce value is acceptable, and the TPM signature is valid.

4. The method of claim 3, wherein determining that the TPM value is associated with an acceptable configuration comprises comparing the TPM value with one or more values derived from the one or more health policies.

5. The method of claim 2,
wherein receiving a health status report includes receiving a single network communication from the second network device that includes both the health status report and authentication information, and
wherein sending credentials to the second network device further comprises authenticating the second network device with the first network device based on the authentication information and sending the credentials when the second network device is authenticated.

6. The method of claim 1, wherein the one or more health policies correspond to one or more authorization levels that provide access to one or more secured multicasts.

7. The method of claim 1, further comprising:
monitoring, with the multicast access control server, communication and activity information of the endpoint device;
determining whether communication and activity information of the endpoint device satisfy one or more behavior policies, wherein the one or more behavior policies each include information describing acceptable communication and activities for a network device; and
revoking access to the secure multicast content when the endpoint device fails to satisfy the one or more behavior policies.

8. The method of claim 7, wherein revoking access to the secure multicast content comprises sending new credentials to one or more other network devices.

9. A method comprising:
sending, to a multicast access control server from an endpoint device, a first request for access to secure multicast content;
prior to receiving credentials that provide access to the secure multicast content, sending a health status report for the endpoint device to the multicast access control server, wherein the health status report comprises information describing a configuration of the endpoint device; and
receiving the credentials that provide access to the secure multicast content, wherein the credentials comprise a certificate indicating that the network device has an acceptable configuration that conforms to one or more health policies that must be satisfied before the endpoint device is allowed to receive secure multicast content, and wherein the certificate includes a timestamp indicating a date and time that the multicast access control server verified the configuration of the network device;
sending the certificate with a second request for access to secure multicast content;
receiving, in response to the second request, a cryptographic key;
receiving secure multicast content; and
decrypting the secure multicast content using the cryptographic key.

10. The method of claim 9, wherein sending a health status report includes sending authentication information.

11. The method of claim 9, further comprising:
generating a trusted platform module ("TPM") signature comprising a TPM value and a nonce value,
wherein the health status report includes the TPM signature.

12. The method of claim 9, wherein the network device includes a health reporting agent, the method further comprising:
monitoring, with the health reporting agent, communication and activity information of the network device; and
sending a representation of the communication and activity information to a verification device.

13. A method comprising:
receiving, with a first network device, a request for access to secure multicast content;
receiving a certificate for a second network device, wherein the certificate indicates that the second network device has an acceptable configuration that conforms to one or more health policies that must be satisfied before the second network device is allowed to receive secure multicast content, and wherein the certificate includes a timestamp indicating a date and time that a multicast access control server verified the configuration of the second network device;
determining whether the certificate is valid based at least in part on the timestamp; and
sending, to the second network device, a cryptographic key that provides access to secure multicast content when the certificate is valid.

14. The method of claim 13,
wherein receiving the certificate includes receiving authentication information, and further comprising authenticating the second network device with the first network device based on the authentication information, and
wherein sending credentials to the second network device further comprises sending the credentials when the second network device is authenticated.

15. An access control device comprising:
a communication module that receives, from a network device, a request for access to secure multicast content, wherein the request includes a health status report that comprises information describing a configuration of the network device;
one or more health policies, wherein the one or more health policies each include information describing acceptable characteristics for a network device; and
an authorization module that comprises a health evaluation module that determines, after receiving the request and prior to providing access to the secure multicast content, whether characteristics of the network device satisfy the one or more health policies by comparing the health status report with the one or more health policies,
wherein the communication module sends credentials to the network device when the characteristics of the network device satisfy the one or more health policies, wherein the credentials comprise a certificate indicating that the network device has been verified by the access control server to have a configuration that conforms to one or more health policies that must be satisfied before the endpoint device is allowed to receive secure multicast content, and wherein the certificate includes a timestamp indicating a date and time that the multicast access control server verified the configuration of the network device, and
wherein the communication module subsequently receives a second request to access the secure multicast content, the second request including the certificate for the network device, and
wherein the authorization module, upon determining that the certificate is valid based on the timestamp, sends a cryptographic key to the network device to decrypt the secure multicast content.

16. The access control device of claim 15,
wherein the communication module receives authentication information with the health status report, and
wherein the authorization module authenticates the network device based on the authentication information.

17. The access control device of claim 15, wherein the one or more health policies correspond to one or more authorization levels that provide access to one or more secured multicasts.

18. The access control device of claim 15, further comprising:
an endpoint behavior evaluation module that monitors communication and activity information of the network device;

one or more behavior policies, wherein the one or more behavior policies each include information describing acceptable communication and activities for a network device, wherein the endpoint behavior evaluation module instructs the access control device to revoke access to the secure multicast content when the network device fails to satisfy the one or more behavior policies.

19. The access control device of claim 15, wherein the access control devices revokes access to the secure multicast content by directing the communication module to send new credentials to one or more other network devices.

20. The access control device of claim 15, wherein the health status report includes a trusted platform module ("TPM") signature comprising a TPM value and a nonce value, wherein the health evaluation module determines whether the TPM value is associated with an acceptable configuration, the nonce value is acceptable, and the TPM signature is valid, and wherein the communication module sends the credentials to the network device when the TPM value is associated with an acceptable configuration, the nonce value is acceptable, and the TPM signature is valid.

21. The access control device of claim 20, wherein the health evaluation module determines whether the TPM value is associated with an acceptable configuration by comparing the TPM value with one or more values derived from the one or more health policies.

22. An endpoint device comprising:

a processor executing a communication module that:

sends a first request for access to secure multicast content;

prior to receiving credentials that provide access to the secure multicast content, sends a health status report for the network device, wherein the health status report comprises information describing a configuration of the network device; and receives credentials that provide access to the secure multicast content, wherein the credentials comprise a certificate indicating that the endpoint device has an acceptable configuration that conforms to one or more health policies that must be satisfied before the endpoint device is allowed to receive secure multicast content, and wherein the certificate includes a timestamp indicating a date and time that the multicast access control server verified the configuration of the endpoint device;

sends a second request for access to secure multicast content, wherein the second request includes the credentials;

receives, in response to the second request, a cryptographic key;

receives secure multicast content; and decrypts the secure multicast content using the cryptographic key.

23. The endpoint device of claim 22, wherein the communication module receives a request for a health status report for the network device prior to sending the health status report.

24. The endpoint device of claim 22, wherein the communication module receives a request for a health status report after receiving the credentials;

wherein the communication module sends a health status report after receiving the request, wherein the health status report comprises information describing a configuration of the endpoint device.

25. The endpoint device of claim 22, wherein the communication module includes authentication information when sending a health status report.

26. The endpoint device of claim 22, further comprising a trusted platform module ("TPM") that generates a TPM signature comprising a TPM value and a nonce value, wherein the health status report includes the TPM signature.

27. The endpoint device of claim 22, further comprising a health reporting agent that:

monitors communication and activity information of the network device; and instructs the communication module to send a representation of the communication and activity information to a verification device.

28. A network device comprising a communication module that:

receives a request for access to secure multicast content;

receives a certificate for an endpoint device, wherein the certificate indicates that the endpoint device has previously been confirmed to have an acceptable configuration that conforms to one or more health policies that must be satisfied before the endpoint device is allowed to receive secure multicast content, and wherein the certificate includes a timestamp indicating a date and time that an access control device verified the configuration of the endpoint device;

sends the certificate to the access control device;

receives, from the access control device, an indication of whether the certificate is valid based at least in part on the timestamp; and sends, to the endpoint device, a cryptographic key that provides access to secure multicast content when the certificate is valid.

29. The network device of claim 28, wherein the communication module:

receives authentication information with the certificate;

sends the authentication information to the access control device;

receives, from the access control device, an indication of whether the endpoint device is authenticated; and sends, to the endpoint device, a cryptographic key that provides access to secure multicast content when the endpoint device is authenticated and the certificate is valid.

30. A computer-readable storage medium comprising instructions, wherein the instructions cause one or more programmable processors of an access control device to:

receive, from a network device, a request for access to secure multicast content;

after receiving the request and prior to providing access to the secure multicast content, determine, with the access control device, whether characteristics of the network device satisfy one or more health policies; and send credentials to the network device when the characteristics of the network device satisfy the one or more health policies, wherein the credentials provide access to the secure multicast content, wherein the credentials comprise a certificate indicating that the endpoint device has been verified by the multicast access control server to have a configuration that conforms to one or more health policies that must be satisfied before the endpoint device is allowed to receive secure multicast content, and wherein the certificate includes a timestamp indicating a date and time that the multicast access control server verified the configuration of the endpoint device;

receive, with a secure multicast system, the certificate for the second network device;
determine, with the secure multicast system and based on the timestamp, whether the certificate is valid; and
send a cryptographic key to the endpoint device when the certificate is valid for decryption of the secure multicast content.

\* \* \* \* \*